United States Patent [19]
Okazaki et al.

[11] Patent Number: 5,504,752
[45] Date of Patent: Apr. 2, 1996

[54] PULSE STUFFING SYNCHRONIZATION CONTROL SYSTEM

[75] Inventors: Takeshi Okazaki, Kawasaki; Seiichi Takagi, Shiraimachi; Toshihiro Yamakawa, Tokyo, all of Japan

[73] Assignees: Fujitsu Limited, Kawasaki; Nippon Telegraph and Telephone Corporation, Tokyo, both of Japan

[21] Appl. No.: 319,147

[22] Filed: Oct. 6, 1994

Related U.S. Application Data

[63] Continuation of Ser. No. 4,892, Jan. 21, 1993, abandoned.

[30] Foreign Application Priority Data

Jan. 20, 1992 [JP] Japan ..................... 4-007457

[51] Int. Cl.⁶ ...................................... H04L 7/04
[52] U.S. Cl. .......................... 370/102; 370/109; 375/375
[58] Field of Search ........................ 370/102, 84, 100.1, 370/105.1, 105.2, 105.4, 105.5, 109, 112, 106; 375/371, 354, 362, 373, 374, 375, 376; 348/500, 471, 472, 488

[56] References Cited

U.S. PATENT DOCUMENTS

| | | | |
|---|---|---|---|
| 4,811,340 | 3/1989 | McEachern et al. | 370/102 |
| 4,825,436 | 4/1989 | Kobayashi et al. | 370/102 |
| 4,941,156 | 7/1990 | Stern et al. | 375/118 |
| 5,030,951 | 7/1991 | Eda et al. | 370/102 |
| 5,142,529 | 8/1992 | Parruck et al. | 370/84 |
| 5,157,655 | 10/1992 | Hamlin, Jr. et al. | 370/84 |
| 5,195,088 | 3/1993 | Urbansky | 375/118 |
| 5,202,904 | 4/1993 | Kamada | 375/118 |

FOREIGN PATENT DOCUMENTS

63-258131  10/1988  Japan.

Primary Examiner—Melvin Marcelo
Assistant Examiner—Huy D. Vu
Attorney, Agent, or Firm—Greer, Burns & Crain, Ltd.

[57] ABSTRACT

A pulse stuffing synchronization control system includes a memory circuit for storing a plurality of items of lower digital hierarchy data input thereto in parallel, a clock generator for generating a writing clock signal and a control clock signal, a data writing controller for writing the plurality of items of the lower digital hierarchy data in synchronism with the writing clock signal, a read clock output circuit for generating a reading clock signal, a pulse stuffing controller for generating stuffing information based on the difference between the phases of a transmission clock signal and the control clock signal generated by the clock generator and for controlling the number of pulses of the writing clock signal based on the stuffing information, and a data read controller for reading out the plurality of items of the lower digital hierarchy data from the memory means in synchronism with the reading clock signal processed by the pulse stuffing controller, so that higher digital hierarchy data is output from said memory means in synchronism with the reading clock signal processed by the pulse stuffing controller.

11 Claims, 9 Drawing Sheets

PULSE STUFFING SYNCHRONIZATION CONTROL SYSTEM

RELATED APPLICATION

This is a continuation of application Ser. No. 08/004,892, filed on Jan. 21, 1993, abandoned.

BACKGROUND OF THE INVENTION (1) Field of the Invention

The present invention generally relates to a pulse stuffing synchronization control system, and more particularly to a pulse stuffing synchronization control system in which a plurality of items of lower digital hierarchy data are multiplexed in accordance with a time-division multiplexing (TDM) method and multiplexed data is output in synchronization with a transmission clock for higher digital hierarchy data.

(2) Description of Related Art

There is a system in which a plurality of items of lower digital hierarchy data are multiplexed in accordance with the TDM method and multiplexed data is transmitted. In this system, when the product of the transmission rate for the lower digital hierarchy data and the multiplexing number thereof does not correspond to the transmission rate for the higher digital hierarchy, a pulse stuffing synchronization control is performed so that the multiplexed data is output in synchronization with the transmission clock for the higher digital hierarchy data.

Figure 1:
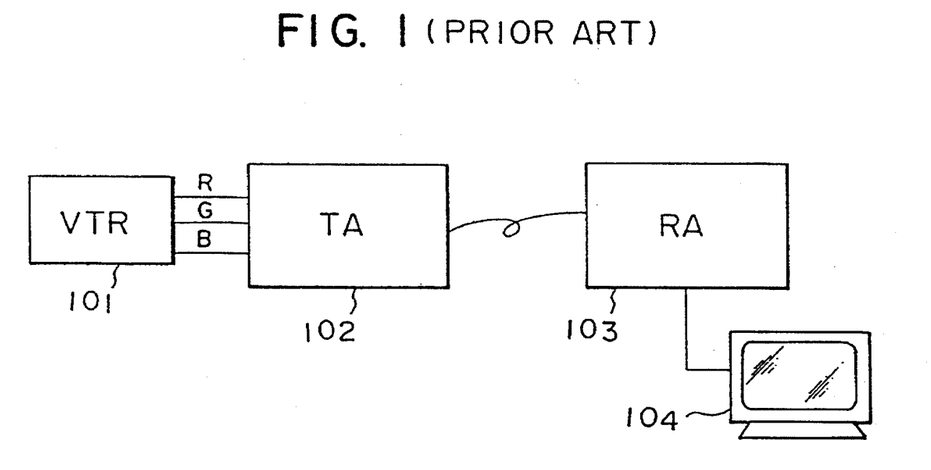
FIG. 1 is a block diagram illustrating a system in which video information output from a VTR set is transmitted from a transmitter 102 to a receiver 103 via a line.

A system as shown in FIG. 1 has been proposed, in which system video information output from a video tape recorder (VTR) set 101 is transmitted from a transmitter 102 to a receiver 103 via a line. The video information received by the receiver 103 is displayed on a cathode ray tube (CRT) display unit 104. In this system, the VTR set 101 outputs three components of an analog video signal, such as an R component, a G component and a B component. In the transmitter 102 to which the three components R, G and B are supplied from the VTR set 101, the three components R, G and B are digitized in synchronization with a sampling clock. The three digital video signal components are then multiplexed in accordance with the TDM method and the multiplexed data is transmitted in synchronization with a transmission clock. The sampling clock used for digitizing the three components R, G and B is generally in a synchronization with the transmission clock. Thus, the pulse stuffing synchronization control is needed to transmit the multiplexed data of the three digital video signal components R, G and B in synchronization with the transmission clock.

Figure 2:
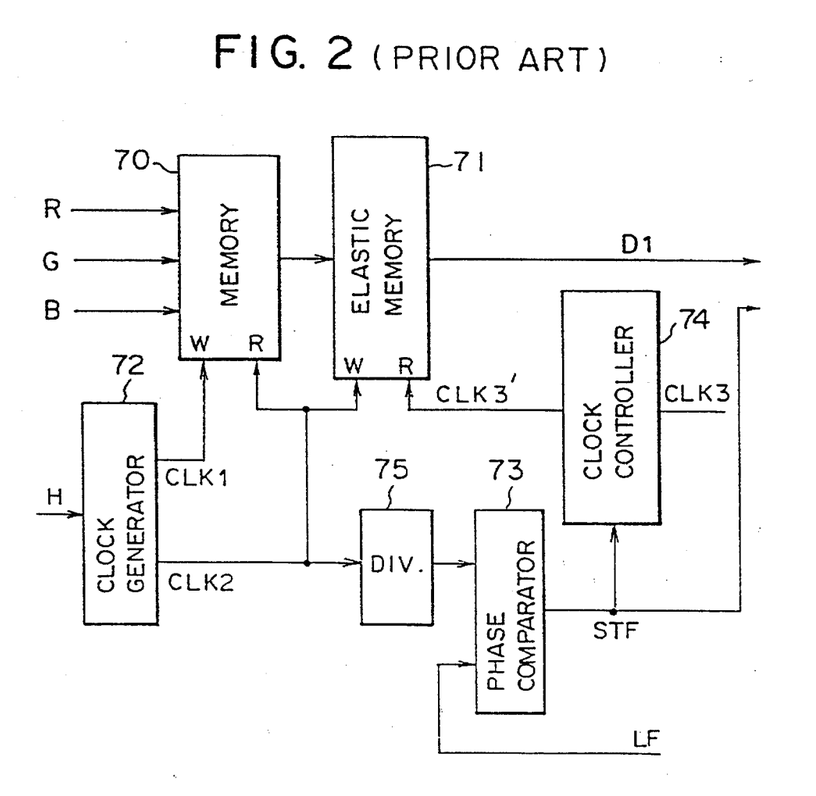
FIG. 2 is a block diagram illustrating a conventional pulse stuffing synchronization control system provided in the transmitter shown in FIG. 1.

A conventional system in which the pulse stuffing synchronization control is performed is shown in FIG. 2. This conventional system is provided in the transmitter 102 shown in FIG. 1. In the system shown in FIG. 2, the three digital video signal components R, G and B (corresponding to the lower digital hierarchy data) are multiplexed with the TDM method except for each horizontal blanking period, and the multiplexed data is output in synchronization with the transmission clock using the pulse stuffing synchronization control.

Referring to FIG. 2, the system comprises a memory circuit 70, an elastic memory circuit 71, a clock generator 72, a phase comparator 73, a clock controller 74 and a dividing circuit 75. The digital video signal components R, G and B are supplied to the memory circuit 70 in parallel. The memory circuit 70 is used for multiplexing the digital components R, G and B in accordance with the TDM method. The clock generator 72 is provided with PLL (phase-locked loop) circuits, and generates a first clock signal CLK1 and a second clock signal CLK2 based on a horizontal synchronizing signal H of the video signal supplied from the VTR set 1. The frequencies of the first and second clock signals CLK1 and CLK2 differ from each other. The first clock signal CLK1 is supplied to a writing clock terminal (W) of the memory circuit 70 so that the digital video signal components R, G and B are written into the memory circuit 70 in synchronization with the first clock signal CLK1. The clock rate of the second clock signal CLK2 corresponds to an average digital transmission rate obtained by multiplexing the digital video signal components R, G and B. The ratio of the frequency of the first clock signal CLK1 to the frequency of the second clock signal CLK2 is not always an integer. Thus, the transmitter 2 is provided with two PLL circuits for respectively generating the first and second clock signals CLK1 and CLK2. The second clock signal CLK2 is supplied to both a read clock terminal (R) of the memory circuit 70 and a write clock terminal (W) of the elastic memory circuit 71. That is, the digital video signal components R, G and B are read out in synchronization with the second clock signal CLK2 from the memory circuit 70 so as to be multiplexed. The multiplexed data read out from the memory circuit 70 is written in synchronization with the second clock signal CLK2 into the elastic memory circuit 71. The elastic memory circuit 71 is used for the pulse stuffing synchronization control. A third clock signal CLK3 for higher digital hierarchy data is processed by the clock controller 74 and a clock signal CLK3' output from the clock controller 74 is supplied to a read clock terminal (R) of the elastic memory circuit 71. That is, the multiplexed data D1 is read out in synchronization with the clock signal CLK3' from the elastic memory circuit 71.

The divider 75 divides the second clock signal CLK2 by N. The phase comparator 73 compares the phase of a divided transmission clock signal LF, obtained by dividing a transmission clock signal, with the phase of the 1/N clock signal output from the divider 75. The phase comparator 73 activates a stuffing request signal STF in accordance with the difference between the phases of the divided transmission clock signal LF and the 1/N clock signal. The stuffing request signal STF is supplied from the phase comparator 73 to the clock controller 74. When the stuffing request signal STF is activated the clock controller 74 suppresses pulses of the third clock signal CLK3 and outputs the clock signal CLK3'. The clock signal CLK3' is supplied to the read clock terminal (R) of the elastic memory circuit 71. The higher digital hierarchy data D1 read out in synchronization with the clock signal CLK3' from the elastic memory 71 is supplied to a transmission frame multiplexer (not shown) along with the stuffing request signal STF. The higher digital hierarchy data D1 and the stuffing request signal STF are multiplexed by the transmission frame multiplexer and output to the line. The multiplexed data is transmitted to the receiver 3 in synchronization with the transmission clock signal.

In the above system, the digital video signal components R, G and B corresponding to the lower digital hierarchy data are multiplexed in accordance with the TDM method by use of the memory circuit 70 and the pulse stuffing synchronization control of the multiplexed signal output from the memory circuit 70 is performed by use of the elastic memory circuit 71. That is, the conventional system requires two memory circuits (the memory circuit 70 and the elastic memory circuit 71) capable of being operated at a high speed. Thus, the size of the circuit constituting the system and the production cost of the system are large.

SUMMARY OF THE INVENTION

Accordingly, a general object of the present invention is to provide a pulse stuffing synchronization control system in which the disadvantages of the aforementioned prior art are eliminated.

A more specific object of the present invention is to provide a pulse stuffing synchronization control system having a simple structure.

The above objects of the present invention a achieved by a pulse stuffing synchronization control system comprising: memory means for storing a plurality of items of lower digital hierarchy data input thereto in parallel; clock generating means for generating a writing clock signal and a control clock signal; data writing means, coupled to the memory means and the clock generating means, for writing the plurality of items of the lower digital hierarchy data in synchronization with the writing clock signal; read clock generating means for generating a reading clock signal; pulse stuffing control means, coupled to the clock generating means and the read clock generating means, for generating stuffing information based on a difference between phases of a predetermined external clock signal and the control clock signal generated by the clock generating means and for controlling a number of pulses of the writing clock signal supplied from the read clock generating means based on the stuffing information; and data read means for reading out the plurality of items of the lower digital hierarchy data from the memory means in synchronism with the reading clock signal processed by the pulse stuffing control means, so that higher digital hierarchy data is output from the memory means in synchronism with the reading clock signal processed by the pulse stuffing control means.

According to the present invention, both the multiplexing of a plurality of items of the lower hierarchy data and the pulse stuffing control operation can be performed using only a single memory circuit. Thus, a pulse stuffing synchronization control system having a simple structure can be provided.

Additional objects, features and advantages of the present invention will become apparent from the following detailed description when read in conjunction with the accompanying drawings.

DESCRIPTION OF THE PREFERRED EMBODIMENTS

A description will now be given, with reference to FIG. 3, of the principle of an embodiment of the present invention.

Figure 3:
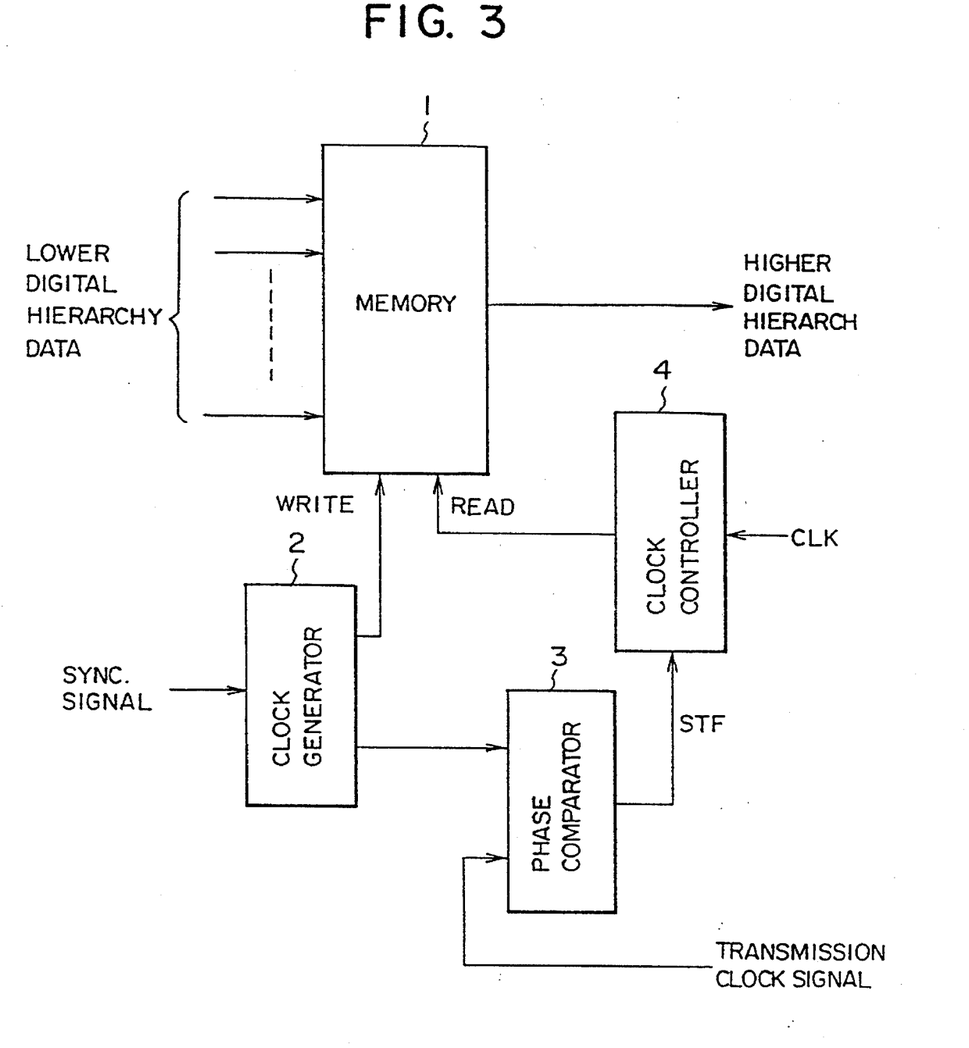
FIG. 3 is a block diagram illustrating the principle of a pulse stuffing synchronization control system according to an embodiment of the present invention.

Referring to FIG. 3, a pulse stuffing synchronization control system comprises a memory circuit 1 to which a plurality of items of lower digital hierarchy data is supplied, a clock generator 2, a phase comparator 3 and a clock controller 4. In this embodiment, the memory circuit 1 is used for multiplexing a plurality of items of lower digital hierarchy data and for performing the pulse stuffing synchronization control.

A description will now be given, with reference to FIGS. 4–7, of the embodiment of the present invention.

Figure 4:
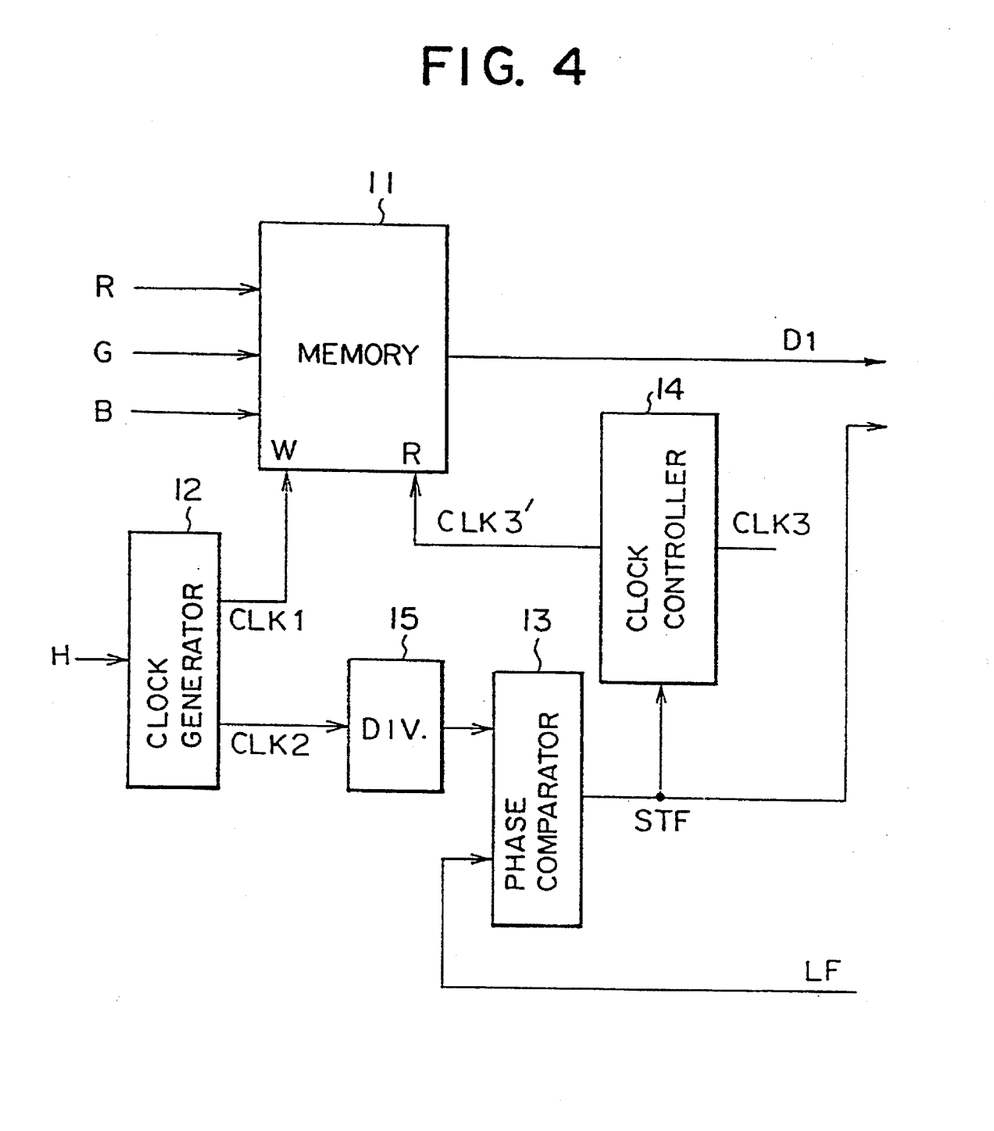
FIG. 4 is a block diagram illustrating essential parts of the pulse stuffing synchronization control system according to the embodiment of the present invention.

FIG. 4 shows essential parts of a pulse stuffing synchronization control system. Referring to FIG. 4, a memory circuit 11, a clock generator 12, a phase comparator 13 and a clock controller 14 respectively correspond to the memory circuit 1, the clock generator 2, the phase comparator 3 and the clock controller 4 shown in FIG. 3. The pulse stuffing synchronization control system is provided in the transmitter 102 shown in FIG. 1.

The digital video signal components R, G and B supplied from the VTR set 101 are supplied to the memory circuit 11 in parallel. The horizontal synchronizing signal H of the video signal is supplied from the VTR set 101 to the clock generator 12. The clock generator 12 generates a first clock signal CLK1 and a second clock signal CLK2 in synchronism with the horizontal synchronous signal H of the video signal. The first clock signal CLK1 is supplied to a write clock terminal (W) of the memory circuit 11. The digital video signal components R, G and B are written into the memory circuit 11 in synchronization with the first clock signal CLK1. The second clock signal CLK2 is supplied to a dividing circuit 15. The dividing circuit 15 divides the second clock signal CLK2 by N and outputs a 1/N clock signal. The 1/N clock signal and a divided transmission clock signal LF obtained by dividing a transmission signal are supplied to the phase comparator 13. The phase comparator 13 compares the phase of the 1/N clock signal supplied from the dividing circuit 15 with the phase of the divided transmission signal LF. The phase comparator 13 outputs the stuffing request signal STF corresponding to the difference between the phases of the 1/N clock signal and the divided transmission signal LF. The clock controller 14 is provided with a third clock signal CLK3 for higher digital hierarchy data. When the stuffing request signal STF is supplied from the phase comparator 13 to the clock controller 14, the clock controller 14 selectively suppresses pulses of the third clock signal CLK3 and outputs a modified clock signal CLK3'. The clock signal CLK3' is supplied to a read clock terminal (R) of the memory circuit 11. That is, higher digital hierarchy data D1 is read out in synchronization with the clock signal CLK3' from the memory circuit 11 so that the digital video signal components R, G and B are multiplexed with the TDM method. The higher digital hierarchy data D1 is supplied, along with the stuffing request signal STF, to a transmission processing unit (not shown in FIG. 4) including a multiplexer and a transmission coding portion. The output data of the transmission unit is output to the transmission line.

Figure 5A:
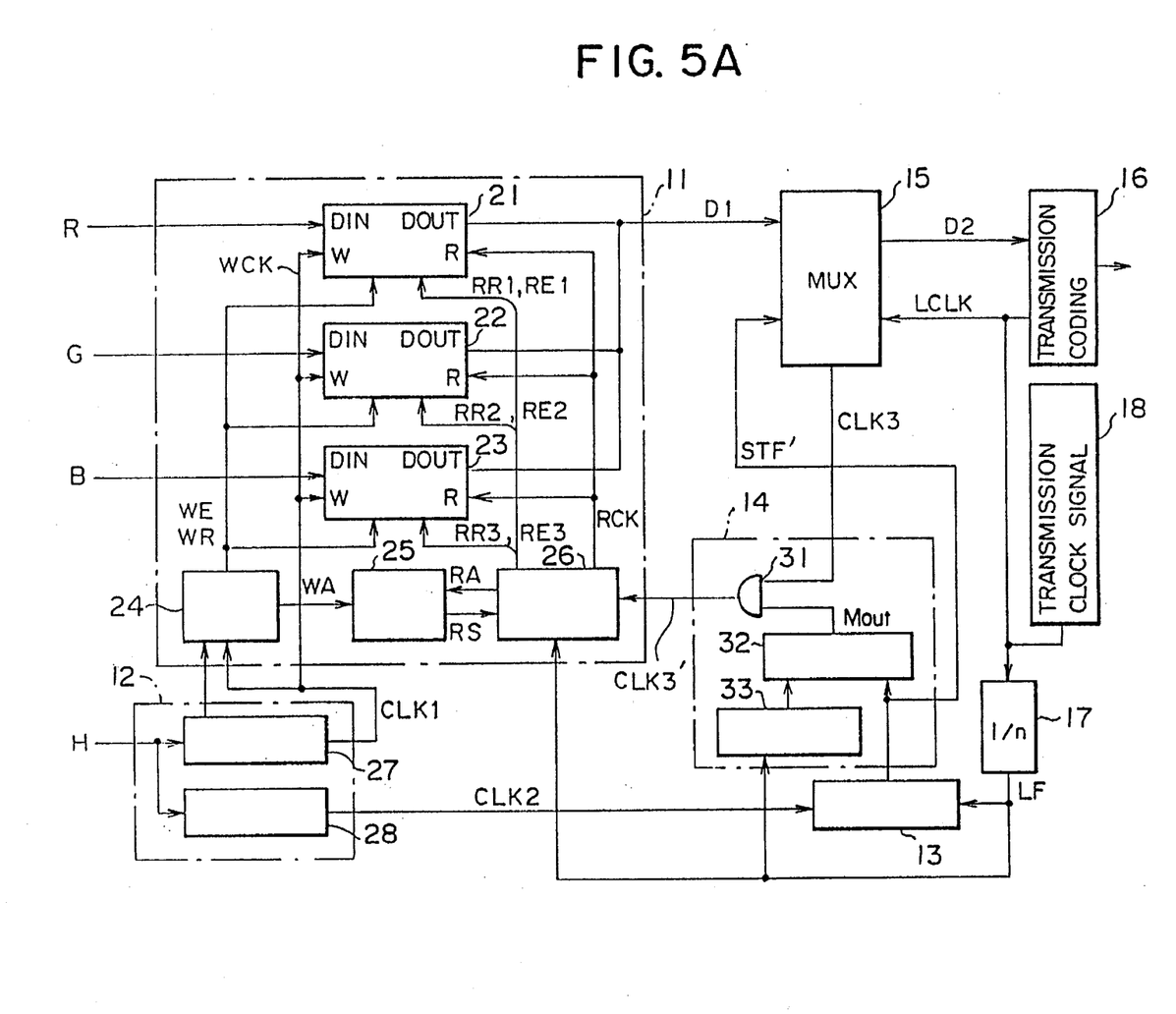
FIG. 5A is a block diagram illustrating the pulse stuffing synchronization control system according to the embodiment of the present invention.

FIG. 5A shows the structure of the pulse stuffing synchronization system in more detail.

Referring to FIG. 5A, the memory circuit 11 is provided with a first FIFO memory 21, a second FIFO memory 22, a third FIFO memory 23, a write controller 24, a memory controller 25 and a read controller 26. The digital video signal components R, G and B are respectively supplied to input terminals Din (R), Din(G) and Din (B) of the first, second and third FIFO memories 21, 22 and 23. The write controller 24 supplies a write-enable signal WE and a write-reset signal WR to the first, second and third FIFO memories 21, 22 and 23. A first read-enable signal RE1 and a first read-reset signal RR1, a second read-enable signal RE2 and a second read-reset signal RR2 and a third read-enable signal RE3 and a third read-reset signal RR3 are supplied from the read controller 26 to the first, second and third FIFO memories 21, 22 and 23 respectively.

The clock generator 12 is provided with PLL (phase-locked loop) circuits 27 and 28 for respectively outputting the first and second clock signals CLK1 and CLK2 in synchronism with the horizontal synchronizing signal H of the video signal. The frequencies of the horizontal synchronizing signal H and the first clock signal CLK1 are, for example, 33.75 kHz and 74.25 MHz respectively. The first clock signal CLK1 output from the PLL circuit 27 is supplied as a write clock signal to the first, second and third FIFO memories 21, 22 and 23 and is supplied to the write controller 24. The write controller 24 controls activation of the write-enable signal WE and the write-reset signal WR with reference to the first clock signal CLK1.

Figure 5B:
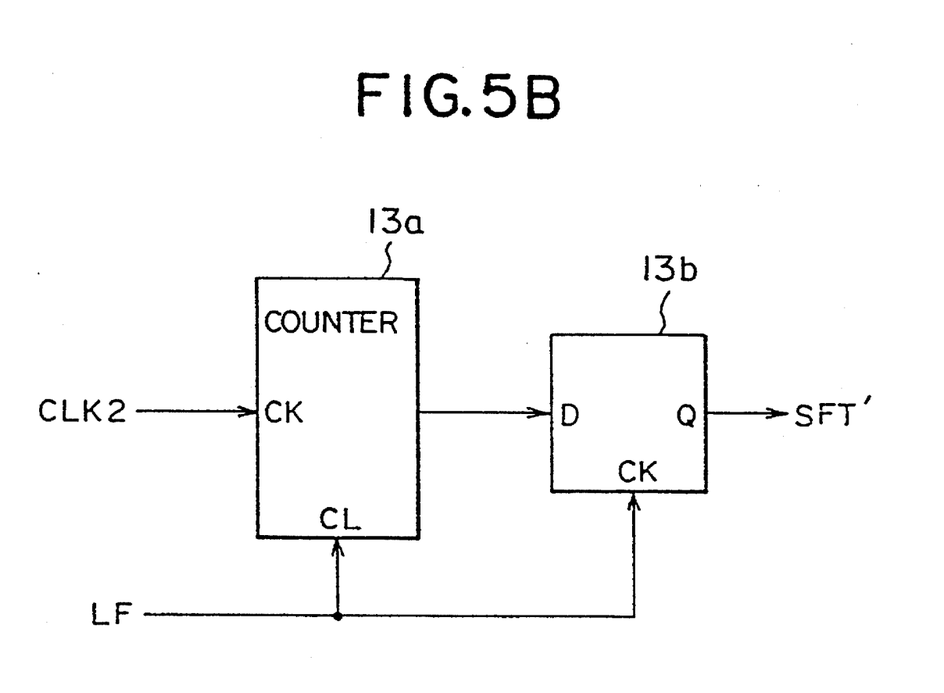
FIG. 5B is a block diagram illustrating the structure of a phase comparator shown in FIG. 5A.

A transmission clock output circuit 18 extracts a transmission clock, for example, from the transmission line, and outputs the transmission clock signal. The transmission clock signal output from the transmission clock output circuit 18 is supplied to a divider 17. The divider 17 divides the transmission clock signal by n and outputs a divided transmission signal LF. The second clock signal CLK2 from the PLL 28 in the clock generator 12 and the divided transmission clock signal LF from the divider 17 are supplied to the phase comparator 13. The frequency of the divided transmission clock signal LF is, for example, 8 kHz. The ratio of the frequency of the second clock signal CLK2 to the frequency of the transmission clock signal LF is an integer. The phase comparator 13 is formed a shown in FIG. 5B. Referring to FIG. 5B, the phase comparator 13 comprises a counter 13a and a latch circuit 13b. The counter 13a counts pulses of the second clock signal CLK2 and is reset by pulses of the divided transmission clock signal LF. The latch circuit 13b latches the count value of the counter 13a every time a pulse of the divided transmission clock signal LF is supplied thereto. The latch circuit 13b outputs the latched count value as stuffing information STF'. According to the phase comparator 13 as shown in FIG. 5B, the stuffing information has a value corresponding to the difference between the phases of the second clock signal CLK2 and the divided transmission signal LF.

The clock controller 14 comprises an AND gate 31, a ROM (read only memory) 32, and a counter 33. The counter 33 is reset and outputs a periodic bit pattern every time a pulse of the divided transmission clock signal LF is supplied thereto. The stuffing information STF' output from the phase comparator 13 and the bit pattern output from the counter 33 are supplied, as address information, to the ROM 32. The ROM 32 outputs a signal Mout in accordance with the stuffing information STF' and the bit pattern. The signal Mout from the ROM 32 and a third clock signal CLK3 for the higher digital hierarchy data are supplied to the AND gate 31, so that the third clock signal CLK3 is gated by the AND gate 31 in accordance with the level of the signal Mout. While the signal Mout is at the low level "0", the AND gate 31 suppresses pulses of the third clock signal CLK3 and output a clock signal CLK3'. The clock signal CLK3' output from the AND gate 31 of the clock controller 14 is supplied, as a read clock RCK, to read clock terminals (R) of the first, second and third FIFO memories 21, 22 and 23, via the read controller 26.

A bytes of data and A±1 bytes of data are, for example, respectively transmitted in an non-stuffing mode and a stuffing mode. In this case, when the stuffing information STF' has respectively values (A+1), A, and (A−1), no zero, one zero and two zeros are selected in the ROM 32. When the counter outputs a predetermined bit pattern for the stuffing operation, the output signal Mout goes low "0" for a time corresponding to the number of zeros selected as described above.

The stuffing information STF' and higher digital hierarchy data D1 formed of the digital video signal components R, G and B output from output terminals Dout(R), Dout(G) and Dout(B) of the first, second and third FIFO memories 21, 22 and 23 are supplied to a multiplexer 15. The multiplexer 15 multiplexes the higher digital hierarchy data D1 and the stuffing information STF', and outputs multiplexed data D2 in synchronization with the transmission clock signal LCLK supplied from the transmission clock circuit 18. The multiplexed data D2 is supplied to a transmission coding circuit 16. The transmission coding circuit 16 converts the multiplexed data D2 into transmission codes and outputs the transmission codes to the transmission line in synchronism with the transmission clock signal LCLK.

Figure 6:
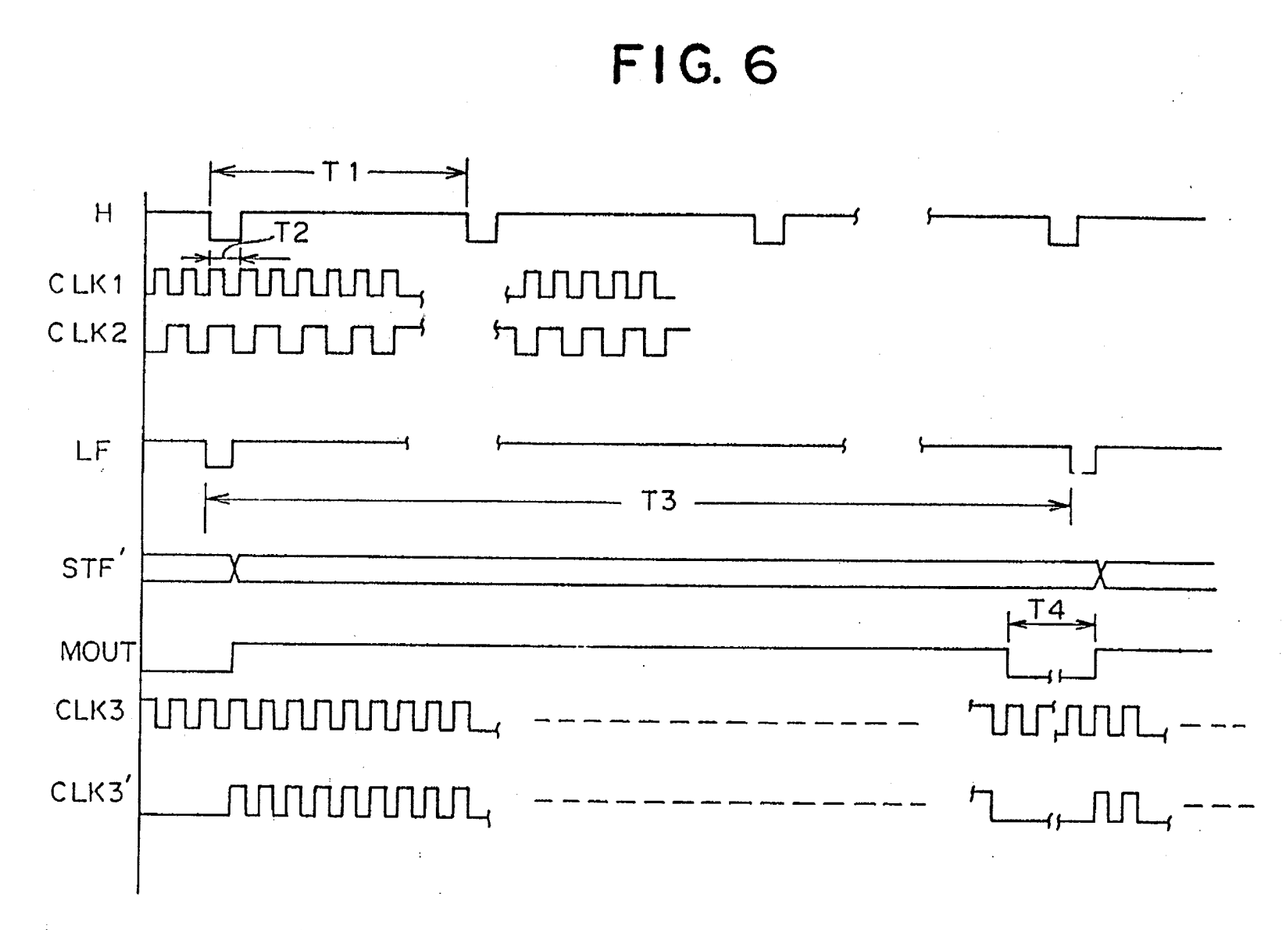
FIGS. 6 and 7 are timing charts illustrating operations of the pulse stuffing synchronization control system.
Figure 7:
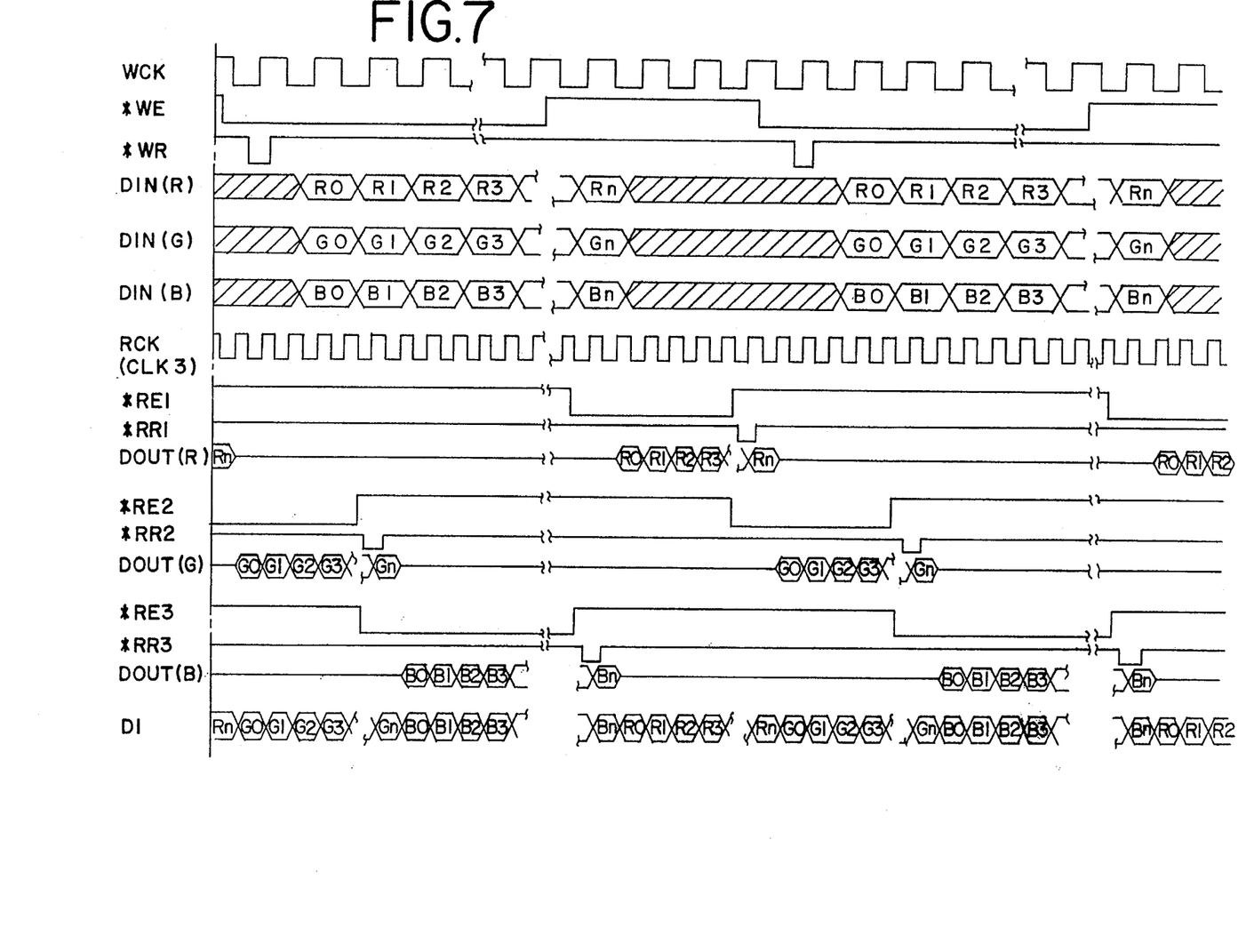

The system shown in FIG. 5A operates in accordance with the timing charts shown in FIGS. 6 and 7. In FIG. 7, a symbol * means an active-low signal.

Referring to FIG. 7, the write-enable signal WE (*WE) and the write-reset signal WR (*WR) are periodically activated. Every time the write-reset signal WR (*WR) is activated in a state where the write-enable signal WE (*WE) is in an active state, the digital video signal components (R0, R1, . . . , and Rn), (G0, G1, . . . , and Gn), and (B0, B1, . . . , and Bn) are respectively written, in synchronization with the write clock signal WCK (CLK1), into the first, second and third FIFO memories 21, 22 and 23 in parallel as shown in Din(R), Din(G) and Din(B).

In FIG. 6, the cycles of the horizontal synchronizing signal H, the first clock signal CLK1, the divided transmission clock signal LF, and the signal Mout are respectively indicated by T1, T2, T3, and T4. The stuffing information has a value corresponding to the number of pulses of the second clock signal CLK2 within the cycle T3 of the divided transmission clock signal LF. The signal Mout output from the ROM 32 is low "0" for a time T4 corresponding to the value of the stuffing information STF'. While the signal Mout is low level "0" (during T4), pulses of the third clock signal CLK3 are suppressed, so that the clock signal CLK3' for the higher digital hierarchy data is supplied, as the read clock signal RCK, to the first, second and third FIFO memories 21, 22 and 23 via the read controller 26.

Returning to FIG. 7, the read controller 26 successively activates the first read-enable signal RE1 (*RE1), the second read-enable signal RE2 (*RE2), and the third read-enable signal RE3 (*RE3) in this order. The read controller 26 also successively activates the first read-reset signal RR1 (*RR1), the second read-reset signal RR2 (*RR2) and the third read-reset signal RR3 (*RR3) in this order. The digital video signal components R0, R1, . . . , and Rn are successively read out from the first FIFO memory 21 in synchronization with the clock signal CLK3' from the time when the first read-enable signal RE1 (*RE1) is activated and until the time when the first read-reset signal RR1 (*RR1) is activated, as shown in Dout(R). The digital video signal components G0, G1, . . . , and Gn are then successively read out from the second FIFO memory 22 in synchronization with the clock signal CLK3' from the time when the second read-enable signal RE2 (*RE2) is activated and until the time when the second read-reset signal RR2 (*RR2) is activated, as shown in Dout(G). After that, the digital video signal components B0, B1, . . . , and Bn are successively read out from the third FIFO memory 23 in synchronization with the clock signal CLK3' from the time when the third read-enable signal RE3 (*RE3) is activated until the time when the third read-reset signal RR3 (*RR3) is activated, as shown in Dout(B). The digital video signal components (R0, R1, . . . , and Rn), (G0, G1, . . . , and Gn) and (B0, B1, . . . , and Bn) are successively supplied, as the higher digital hierarchy data D1, to the multiplexer 15. The higher digital hierarchy data D1 is multiplexed with the stuffing information STF' and output to the transmission line via the transmission coding circuit 16.

The write controller 24 supplies a writing address to the memory controller 25. The read controller 26 supplies a reading address to the memory controller 25. The memory controller 25 determines whether or not an overflow/underflow of each of the FIFO memories 21, 22 and 23 occurs based on a comparison of the writing address and the reading address. When the overflow/underflow occurs, the memory controller 25 supplies a reset pulse RS to the reading controller 26.

In the above embodiment, the number of pulses of the second clock signal CLK2 counted within the cycle T3 of the divided transmission clock signal LF is used as the stuffing information STF'. Alternatively, a difference between a predetermined reference value and the number of pulses of the second clock signal CLK2 counted within the cycle T3 of the divided transmission clock signal LF can be used as the stuffing information STF'.

Digital video signal components Y, $P_R$ and $P_B$ can be substituted for the components R, G and B. In a case where the number of items of the lower digital hierarchy data is greater than three, the number of FIFO memories corresponding to the number of items of the lower digital hierarchy data may be provided in the system. The clock generator 12 can generate clock signals based on a signal obtained by dividing the horizontal synchronizing signal H by M or 1/M.

A description will now be given, with reference to FIGS. 8 and 9, of another embodiment of the present invention.

Figure 8:
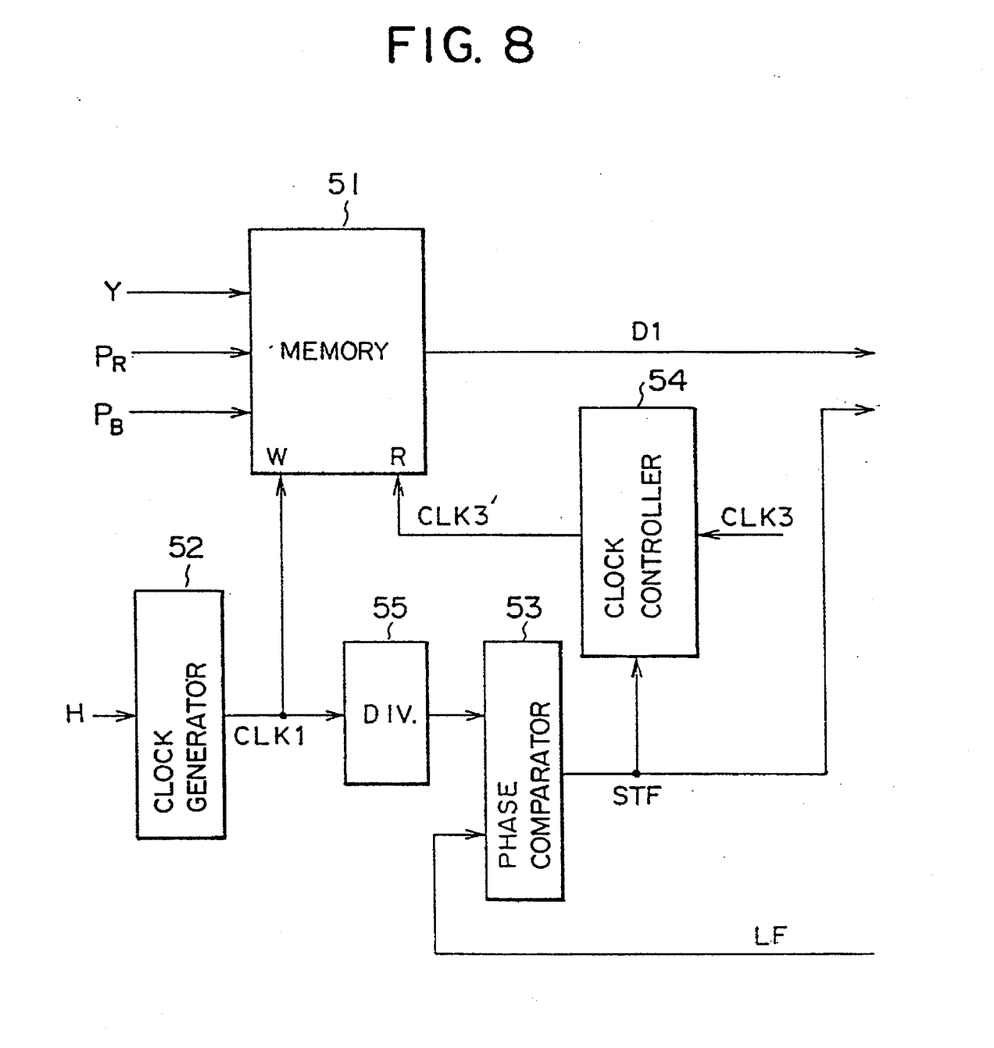
FIG. 8 is a block diagram illustrating a pulse stuffing synchronization control system according to another embodiment of the present invention.

Referring to FIG. 8, a pulse stuffing synchronization system comprises a memory circuit 51, a clock generator 52, a phase comparator 53, a clock controller 54 and a dividing circuit 54. The clock generator 52 generates and outputs a clock signal CLK1 corresponding to the first clock signal CLK1 in the above embodiment. The clock signal CLK1 is supplied to a write clock terminal (W) of the memory circuit 51 and the dividing circuit 55. The digital video signal components Y, $P_R$, and $P_B$ are written in synchronization with the clock signal CLK1 in the memory circuit 51 in parallel. The clock signal CLK1 is supplied to the phase comparator 53 via the dividing circuit 55. The phase comparator 53 outputs the stuffing request signal STF corresponding to the difference between the phases of the clock signal CLK1 and the divided transmission clock signal LF. The clock controller 54 controls the clock signal CLK3 for the higher digital hierarchy data based on the stuffing request signal STF and outputs the clock signal CLK3'. The clock signal CLK3' output from the clock controller 54 is supplied to a read clock terminal (R) of the memory circuit 51. The digital video signal components Y, $P_R$ and $P_B$ are successively read out in synchronization with the clock signal CLK3' from the memory circuit 51, so that the higher digital hierarchy data D1 formed of the digital video signal components Y, $P_R$ and $P_B$ is output from the memory circuit 51. The higher digital hierarchy data D1 and the stuffing request signal STF are multiplexed and output to the transmission line.

Figure 9:
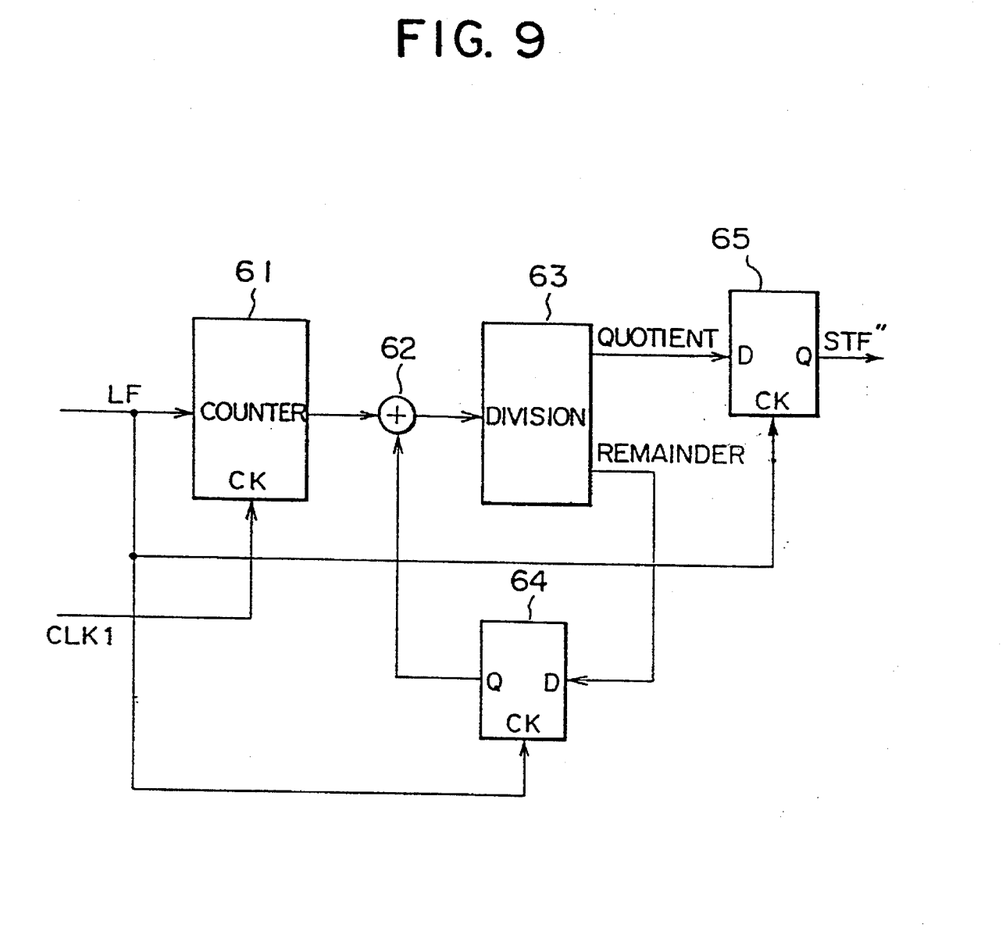
FIG. 9 is a block diagram illustrating a phase comparator included in the pulse stuffing synchronization control system shown in FIG. 8.

The phase comparator 53 is formed as shown in FIG. 9.

Referring to FIG. 9, the phase comparator 53 comprises a counter 61, an adder 62, a division circuit 63, a first flip-flop 64 and a second flip-flop 65. The counter 61 counts pulses of the clock signal CLK1 in each cycle of the divided transmission clock signal LF. The frequency of the divided transmission clock signal LF is, for example, 8 kHz, and the frequency of the clock signal CLK1 is equal to, for example, a sampling frequency 14.85 MHz for the components $P_R$ and $P_B$ of the video signal. The adder 62 adds a remainder supplied thereto from the division circuit 63 via the first flip-flop 64 to the count value S of the counter 61.

In a case where the video signal is sampled in synchronization with the clock signal CLK1 of 14.85 MHz, there are 440 sampling times in each horizontal scanning line. However, as the data sampling cannot be performed during each horizontal synchronizing period, only 384 items of data can actually be sampled in each horizontal scanning line. Thus, (384/440) items of data can be actually sampled by each pulse of the clock signal CLK1 of 14.85 MHz. The video signal component Y is sampled in synchronization with a clock signal of 44.55 MHz which has three times the frequency of the sampling clock (14.85 MHz) of the video signal components $P_R$ and $P_B$. In this case, until the count value of the counter 61 reaches S, S.(384/440) items of each of the video signal components $P_R$ and $P_B$ and S.(384/440)×3 items of the video signal component Y are sampled. Thus, when the count value of the counter 61 has reached S, the total number of items of sampled data is calculated as follows.

$$S.(384/440) \times 3 + S.(384/440) + S.(384/440) = S.(384/440) \times 5$$

That is, S.(384/440)×5 items of component data may be multiplexed in each transmission frame. In a case where the multiplexing operations are performed in four slots in parallel, the number of items of sampled data is S.(384/440)×5/4. In this case, the division circuit 63 performs a calculation of S.(12/11). The quotient of the calculation made by the division circuit 53 is supplied, as stuffing information STF", to each slot the multiplexer via the second flip-flop 65. The remainder of the division is supplied to the adder 62 via the first flip-flop 64. That is, the remainder is added to the count value S in the next cycle, so that the error due to the remainder of the division is corrected.

In the above embodiment, as the ratio of the frequency of the clock signal CLK1 and the divided transmission clock signal LF is not an integer, a discrepancy occurs between the number of items of sampled video signal and the number of items of data to be multiplexed. To eliminate the discrepancy, the count value S corresponding to the difference between the phases of the clock signal CLK1 and the divided transmission clock signal LF is corrected based on the number of items of video data actually sampled. According to this embodiment, the stuffing synchronization control can be performed using the same clock signal as that used for writing the video signal components in the memory 51. That is, the clock generator 52 may output a single clock signal CLK1.

The present invention is not limited to the aforementioned embodiments, and variations and modifications may be made without departing from the scope of the claimed invention.

What is claimed is:

1. A data synchronization control system comprising:
    memory means for storing a plurality of items of lower digital hierarchy data input thereto in parallel;
    clock generating means, responsive to a predetermined sampling clock, for generating a writing clock signal and a control clock signal;
    data writing means, coupled to said memory means and said clock generating means, for writing said plurality of items of said lower digital hierarchy data into said memory means in synchronization with the writing clock signal;
    read clock generating means for generating a reading clock signal;
    pulse stuffing control means, coupled to said clock generating means and said read clock generating means, for generating stuffing information based on a difference between phases of a predetermined external clock signal and the control clock signal generated by said clock generating means, and for generating a modified reading clock signal by selectively suppressing pulses of said reading clock signal in response to said stuffing information; and
    data read means, coupled to said memory means and said pulse stuffing control means, for successively and directly reading out said plurality of items of the lower digital hierarchy data from said memory means in synchronization with said modified reading clock signal to directly multiplex said plurality of items of the lower digital hierarchy data into higher digital hierarchy data wherein said multiplexing occurs during said successive reading out of items of the lower digital hierarchy data.

2. The system as claimed in claim 1, wherein a ratio of a frequency of the control signal generated by said clock generating means to a frequency of the predetermined external clock signal is an integer.

3. The system as claimed in claim 1, wherein the higher digital hierarchy data is transmitted in synchronization with a transmission clock signal to a receiver via a transmission line, and wherein the predetermined external clock signal is generated by use of the transmission clock signal.

4. The system as claimed in claim 1, wherein the lower digital hierarchy data input to said memory means is video signal component data sampled in synchronization with the predetermined sampling clock signal.

5. The system as claimed in claim 1, wherein the control signal generated by said clock generating means has a transmission rate corresponding to an average transmission rate for data obtained by multiplexing the plurality of items of said lower digital hierarchy data.

6. The system as claimed in claim 1, wherein said memory means comprises a plurality of FIFO memories, each FIFO memory receiving data corresponding to one of said plurality of items of the lower digital hierarchy data.

7. The system as claimed in claim 1, wherein said pulse stuffing control means comprises phase comparator means for outputting stuffing information corresponding to the difference between the phases of the predetermined external clock signal and the control signal, and control means for selectively suppressing pulses of the reading clock signal in accordance with the stuffing information.

8. The system as claimed in claim 7, wherein said phase comparator means comprises a counter for counting a number of pulses of the control clock signal in each cycle of the predetermined external clock signal, and wherein a counting value of said counter is used as the stuffing information.

9. A data synchronization control system comprising:
    memory means for storing a plurality of items of lower digital hierarchy data input thereto in parallel;
    clock generating means, responsive to a predetermined sampling clock, for generating a writing clock signal and a control clock signal;
    data writing means, coupled to said memory means and said clock generating means, for writing said plurality of items of said lower digital hierarchy data into said memory means in synchronization with the writing clock signal;
    read clock generating means for generating a reading clock signal;
    pulse stuffing control means, coupled to said clock generating means and said read clock generating means, for generating stuffing information based on a difference between phases of a predetermined external clock signal and the control clock signal generated by said clock generating means, and for generating a modified reading clock signal by selectively suppressing pulses of said reading clock signal in response to said stuffing information; and
    data read means, coupled to said memory means and said pulse stuffing control means, for successively reading out said plurality of items of the lower digital hierarchy data from said memory means in synchronization with said modified reading clock signal to multiplex said plurality of items into higher digital hierarchy data;
    wherein said pulse stuffing control means comprises phase comparator means for outputting stuffing information corresponding to the difference between the phases of the predetermined external clock signal and the control signal, and control means for selectively suppressing pulses of the reading clock signal in accordance with the stuffing information; and
    wherein a ratio of a frequency of the writing clock signal to a frequency of the predetermined external clock signal is not an integer and the writing clock signal is used as the control signal, and wherein said phase comparator means comprises first means for calculating data corresponding to a difference between the control signal and the predetermined clock signal, and second means for correcting the data calculated by said first means based on the ratio of the frequency of the writing clock signal to the frequency of the predetermined external clock signal, so that the data corrected by said second means is output as the stuffing information from said phase comparator means.

10. The system as claimed in claim 9, wherein said first means comprises a counter for counting a number of pulses of the control signal in each cycle of the predetermined external clock signal, a count value of said counter being supplied to said second means.

11. The system as claimed in claim 10, wherein said second means comprises a division circuit, responsive to an adding result, for performing a predetermined dividing calculation on said adding result and for generating quotient and remainder outputs resulting from the calculation, and an adder, coupled to said first means and said division circuit for adding the remainder output to the counting value supplied from said first means, said adder generating the adding result, the quotient output of said division circuit being used as the stuffing information.

* * * * *

UNITED STATES PATENT AND TRADEMARK OFFICE
CERTIFICATE OF CORRECTION

PATENT NO. : 5,504,752
DATED : April 2, 1996
INVENTOR(S) : Okazaki et al.

It is certified that error appears in the above-indentified patent and that said Letters Patent is hereby corrected as shown below:

Column 3, line 14, delete "a achieved" and insert --are achieved--.

Column 6, line 12, delete "output a" and insert --outputs a--.

Column 7, line 64, delete "circuit 54" and insert --circuit 55--.

Signed and Sealed this

Twenty-second Day of April, 1997

*Attest:*

BRUCE LEHMAN

*Attesting Officer*

*Commissioner of Patents and Trademarks*